(Model.)

W. P. PHILLIPS.
Lubricator.

No. 228,217.

2 Sheets—Sheet 1.

Patented June 1, 1880.

Witnesses
Wm S. Brown
W.C. Wardwell

Inventor
Wm. P. Phillips,
By Charles E. Pratt,
Atty.

(Model.)

2 Sheets—Sheet 2.

W. P. PHILLIPS.
Lubricator.

No. 228,217. Patented June 1, 1880.

Witnesses
Wm. S. Brown
W. E. Wardwell.

Inventor
Wm. P. Phillips,
By Charles E. Pratt,
Atty.

UNITED STATES PATENT OFFICE.

WILLIAM P. PHILLIPS, OF BOSTON, MASSACHUSETTS.

LUBRICATOR.

SPECIFICATION forming part of Letters Patent No. 228,217, dated June 1, 1880.

Application filed April 12, 1880. (Model.)

*To all whom it may concern:*

Be it known that I, WILLIAM P. PHILLIPS, of Boston, Massachusetts, have invented certain new and useful Improvements in Lubricators, of which the following is a specification.

These improvements relate to that class of machinery known as "indicating-lubricators," for supplying the cylinders and valves and pistons of steam-engines with lubricants, and are in the nature of modifications of the devices on which Letters Patent have heretofore been allowed me; and the essential features and objects thereof will be apparent from the following description and explanation, taken in connection with the accompanying drawings, in which—

Figure 1:
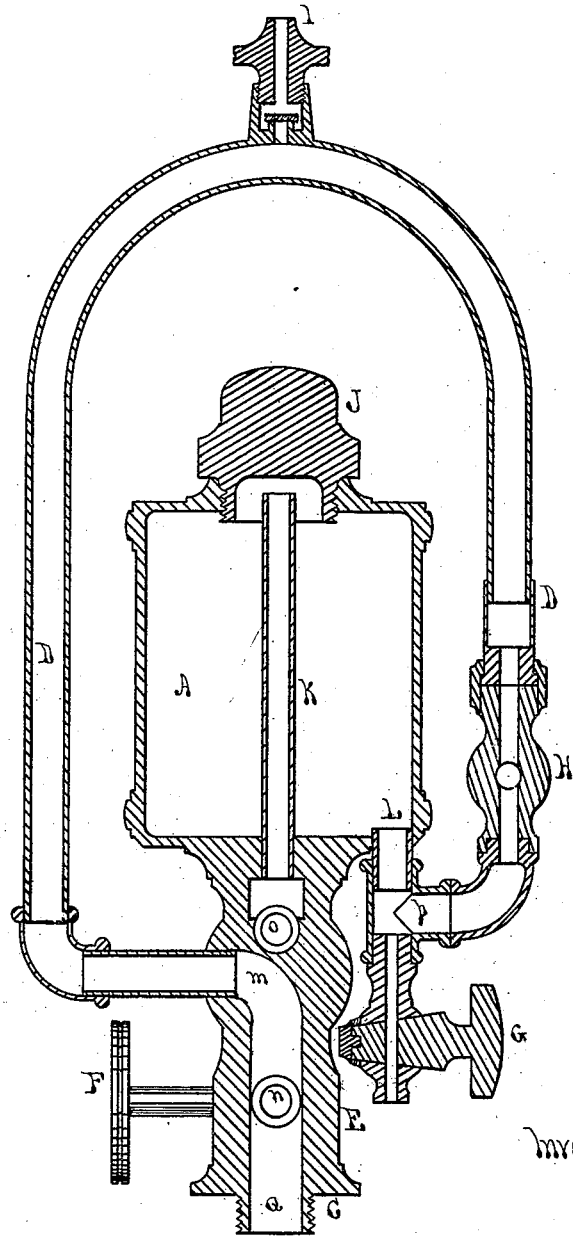
Figure 2:
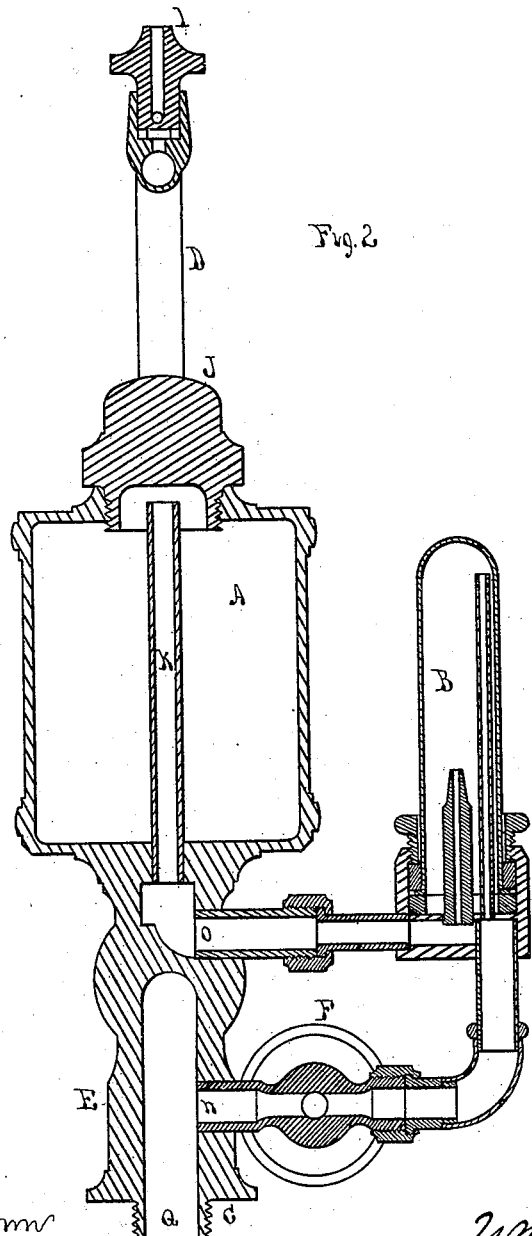

Figures 1 and 2 represent vertical sections through planes at right angles to each other of a device embodying these improvements in one form.

A is an oil-reservoir having a cap, J, or screw-plug of any convenient form, which may be removed for the purpose of filling the reservoir with oil; and the reservoir A is attached to a base part, E, and contains an opening at L for the entrance of water, and a tube, K, extending upward in the reservoir, as I prefer to construct it, which, at any rate, has its upper opening at or near the top of the reservoir, and affords an escape or egress for the oil. The base part or fundament E is somewhat complex in its structure and functions, since it serves not only as a support for the reservoir A, but also as a connection with the steam pipe or chest, as a conduit for the steam, the water, and the oil through four different channels, which may branch from one and return to one, and which I prefer to construct, as shown in the drawings, substantially in one solid piece, having the nipple C externally threaded and adapted to be inserted into a tap or hole internally threaded in the steam-chest or steam-pipe. Through this nipple, by an opening, Q, the steam is admitted and the oil delivered, and, when preferred, I sometimes divide this channel Q, so as to admit the steam and deliver the oil through separate channels. *m* is but a continuation of the steam-channel at Q, leading into the steam-pipe D.

D is a small pipe of even bore throughout, which is bent or coiled either over the reservoir, as shown in the drawings, or coiled around the reservoir, as I sometimes make it, horizontally, to allow the steam an opportunity to cool and condense into water; and it has an air-valve at I, a shut-off and regulating valve at H, and the small bore or channel for the steam and water to continue through. Thence, through *p* and the opening L, the water enters the reservoir A.

G is a plug-cock, which may be turned to allow the water to be drawn off from the reservoir A and the pipe D, as desired.

B is an indicator, such as is described in my previous patents, consisting of a glass tube containing a water-chamber below and an oil-chamber above, the short ingress-tube of which is connected by a small pipe, having its channel at *o*, with the tube K, and its long egress-pipe connected by another tube extending somewhat farther downward, containing the shut-off or regulating valve F, with the channel *n*, which in turn is connected with the steam-chest or steam-pipe through the lower part of the fundament at Q. This form of my contrivance is especially adapted for use on the top of the steam-chest or of a horizontal steam-pipe connected with it. When necessary to attach it to a vertical or otherwise inclined steam-pipe, the form of the fundament may be slightly changed, as required.

To put it in operation the process may be something as follows: A hole or tap may be made in the steam-chest or steam-pipe, and internally threaded, of a size to fit the nipple C, which is then screwed tightly into the tap. The valves H and F are opened, and the air-vent I is also opened, if necessary, to let the air escape, and then closed. The steam enters at Q and passes through *m* and the steam-pipe D, opening L, tube K, opening *o*, and indicator B, then condensing until the glass tube of the indicator is filled with water nearly to the top. The valves H and F are then closed, the water from the reservoir drawn off by the cock G, which is then closed, the reservoir A is filled with oil, and the cap at J screwed tightly on. The valves H and F being then sufficiently opened, the steam passes through the steam-pipe D slowly, entering the reservoir at L in the form of water, and the oil in the reservoir A seeks an escape, drop by drop, through the tube K and the indicator B, into the pipe below, and, as it passes through the opening $n$ and the end of the fundament at Q into the steam pipe or chest, mixes with the steam and lubricates the valves and pistons.

As I usually construct it, the opening $n$ in the oil-delivery pipe is smaller than the passage $m$ into the steam-pipe, and although the pressure in these two pipes is about the same, yet the arrangement of the pipes K, $o$, and $n$ with respect to the other parts is such that, whether the pipe D be horizontal or vertical, or in any other position, a continuous flow of oil regulated at will is secured.

Among the other advantages of this contrivance are the certainty of its operation, the compactness and inexpensiveness of its construction, its little liability to accident or disturbance, and the quickness and ease with which it may be applied by any one immediately to the steam chest or pipe of an engine; and, beside this readiness and simplicity of attachment, which admit of its being put on with great economy and by any mechanic, however unskilled in the art, it also admits of use in positions where the other lubricators now in use could not be attached except with great expense and inconvenience.

I claim as new and as my invention—

1. The fundament E, constructed with its four-way channels, so as to connect the oil-reservoir and the indicator of an indicating-lubricator with each other and with the steam pipe or chest of a steam-engine, and so as to operate substantially as and for the purposes described.

2. In combination, the indicator B, the pipes with openings at $o$ and $n$, the valve F, and the hollow nipple C, arranged and constructed to operate essentially as shown and described.

3. Combined in a lubricator, an oil-reservoir, an indicator, a circuitous steam-pipe, D, and a fundament, E, constructed to connect these with each other and to connect them with and support them upon a steam pipe or chest, substantially as set forth.

4. A compact standing gage-lubricator consisting of the fundament E, with its four-way channels, the pipes $o\ n$, valve F, indicator B, circuitous steam-pipe D, air-vent I, and oil-reservoir A, all constructed and adapted to connect with a steam pipe or chest at one tap, substantially as set forth.

W. P. PHILLIPS.

Witnesses:
WALTER C. WARDWELL,
C. E. PRATT.